(12) United States Patent
Chan et al.

(10) Patent No.: US 6,397,256 B1
(45) Date of Patent: May 28, 2002

(54) MONITORING SYSTEM FOR COMPUTERS AND INTERNET BROWSERS

(75) Inventors: Hoi Yeung Chan, Stamford, CT (US); Thomas Yu-Kiu Kwok, Washington Township, NJ (US); Fred Tze-Keung Tong, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,254

(22) Filed: Jan. 27, 1999

(51) Int. Cl.[7] .............................................. G06F 15/16
(52) U.S. Cl. ...................... 709/229; 709/204; 709/208; 709/210; 709/223; 709/224; 709/225
(58) Field of Search ................................. 709/223–225, 709/229, 204, 208–211

(56) References Cited

U.S. PATENT DOCUMENTS

| | | | | |
|---|---|---|---|---|
| 5,604,509 A | * | 2/1997 | Moore et al. ................... 345/2 |
| 5,790,798 A | * | 8/1998 | Beckett, II et al. .......... 709/224 |
| 5,801,689 A | * | 9/1998 | Huntsman .................... 345/329 |
| 5,809,250 A | * | 9/1998 | Kisor ........................... 709/227 |
| 5,812,785 A | * | 9/1998 | Lappen et al. ............... 709/231 |
| 5,862,330 A | * | 1/1999 | Anupam et al. ............. 709/204 |
| 5,954,798 A | * | 9/1999 | Shelton et al. ............... 709/224 |
| 6,035,332 A | * | 3/2000 | Ingrassis. Jr., et al. ...... 709/224 |
| 6,052,730 A | * | 4/2000 | Felciano et al. ............. 709/225 |
| 6,070,253 A | * | 5/2000 | Tavallaei et al. .............. 714/31 |
| 6,112,240 A | * | 8/2000 | Pogue et al. ................. 709/224 |
| 6,134,668 A | * | 10/2000 | Sheikh et al. ................ 713/310 |
| 6,160,873 A | * | 12/2000 | Truong et al. ......... 379/102.02 |
| 6,178,439 B1 | * | 1/2001 | Feit .............................. 709/200 |
| 6,195,679 B1 | * | 2/2001 | Bauersfeld et al. .......... 709/203 |
| 6,240,444 B1 | * | 5/2001 | Fin et al. ..................... 709/205 |

* cited by examiner

Primary Examiner—Zarni Maung
Assistant Examiner—Saleh Najjar
(74) Attorney, Agent, or Firm—F. CHau & Associates, LLP

(57) ABSTRACT

A system for monitoring Internet usage, in accordance with the present invention, includes an Internet access unit for accessing the Internet, the Internet access unit including a browser for navigating on the Internet. A transmission device is included for transmitting browser activity and providing browser activity information to be transmitted to a monitoring unit. The monitoring unit is remotely disposed from the Internet access unit and coupled to the transmission device, the monitoring unit including a display for viewing and recording Internet activity of the Internet access unit.

26 Claims, 3 Drawing Sheets

MONITORING SYSTEM FOR COMPUTERS AND INTERNET BROWSERS

BACKGROUND OF THE INVENTION

1. Field of the Invention

The present invention relates to a monitoring system for Internet browsers and more particularly to a remote monitoring system for screening Internet usage.

2. Description of the Related Art

With the wide spread use of personal computers and the Internet, Internet users are not limited to a sophisticated group of computer professionals. Rather, Internet use has expanded into all levels of society including usage of the Internet by children. Due to the many advantages of the Internet, access to the Internet has become almost a necessity of our daily activities, in business, school and home life.

The wide spread use of the Internet may presents a problem to parents, teachers and sometimes employers who do not want their students, children or employees to access certain undesirable web sites or information. Current firewall and filtering systems are by no means perfect because some undesirable web sites are hidden under a generic Uniform Resource Locator (URL) and there is no effective way to filter all of them.

Therefore, a need exists for a simple, effective and low cost system for monitoring Internet users to prevent the users from accessing inappropriate or undesired materials on the Internet.

SUMMARY OF THE INVENTION

A system for monitoring Internet usage, in accordance with the present invention, includes an Internet access unit for accessing the Internet, the Internet access unit including a browser for navigating on the Internet. A transmission device is included for transmitting browser activity and providing browser activity information to be transmitted to a monitoring unit. The monitoring unit is remotely disposed from the Internet access unit and coupled to the transmission device, the monitoring unit including a display for viewing and recording Internet activity of the Internet access unit.

Another system for monitoring Internet usage includes at least one computer terminal for accessing the Internet, the at least one computer terminal including a display for viewing Internet activity by a user, the at least one computer terminal including a browser for navigating on the internet. Means for transmitting browser activity from the computer terminal is included to provide browser activity information to be transmitted to a monitoring unit, the means for transmitting including a plug-in software package for collecting the browser activity information and an adapter card for transmitting the browser activity information to the monitoring unit. The monitoring unit is remotely disposed from the at least one computer terminal and coupled to the means for transmitting, the monitoring unit including a display for viewing URLs, contents of URLs and/or snapshots of video images displayed on the display of the at least one computer terminal which were transmitted to the monitor unit for monitoring Internet browser activity on the computer terminal.

In alternate embodiments, the transmission device may include a software plug-in and/or an adapter card. The Internet access unit preferably includes a personal computer or a televison. The monitoring unit may include a receiver for receiving the transmitted browser activity information. The monitoring unit preferably includes a control unit for sending messages to and turning on/off the Internet access unit. The monitoring unit may be coupled to the transmission device by a wireless connection or by a cable. The monitoring unit may further include one of a personal computer, a televison and a personal digital assistant. The transmission device may include a security device to provide password access to the system. The browser activity information may include URLs, contents of URLs and/or screen snapshots for the Internet access unit. The monitor unit may monitor a plurality of Internet access units concurrently.

A system for monitoring computer usage, in accordance with the present invention, includes a display access unit for accessing video data of a computer display. The display access unit includes an adapter card for retrieving video information displayed on the computer display, the adapter card including means for transmitting computer display information to provide computer activity information to be transmitted to a monitoring unit. The monitoring unit is remotely disposed from the display access unit and coupled to the means for transmitting, the monitoring unit including a display for viewing and recording the computer activity information from the computer display.

In alternate embodiments, the display access unit may include a software plug-in. The monitoring unit may include a receiver for receiving the transmitted computer activity information. The monitoring unit preferably includes a control unit for sending messages to and turning on/off the computer display. The monitoring unit may be coupled to the means for transmitting by a wireless connection or by a cable. The monitoring unit may include one of a personal computer, a television and a personal digital assistant. The display access unit may include a security device to provide password access to the system. The computer activity information preferably includes screen snapshots. The monitor unit may monitor a plurality of display access units concurrently.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to a monitoring system for Internet browsers and more particularly to a remote monitoring system for screening Internet usage. The present invention includes an Internet browser software plug-in, a personal computer (PC) adaptor card with transmission capabilities, for example radio frequency transmission capabilities and a receiving device. The receiver device preferably includes a receiver and a remote command module.

The software plug-in interfaces with any existing browser. The software plug-in provides a control interface and a mechanism for collecting information such as URLs, etc. The PC card serves to access a video buffer of the PC and collects information from the software plug-in. The PC card also receives commands from a remote source (i.e., the command module) to transmit the collected information such as URLs and/or the video buffer, to the receiver. The receiver receives information from the PC adaptor and displays the information on a PC monitor or conventional television set. The system can be set to transmit at a fixed time interval or on-demand (controlled by the remote command module). The system may be turned on/off via the remote command module as well as have a password protected interface on the Internet browser (via the software plug-in). The system may be expanded into a monitoring center by using a single remote command module and receiver to monitor multiple users. The system may be integrated into any server/controlling computer to allow an automatic and centralized monitoring and recording system.

Figure 1:
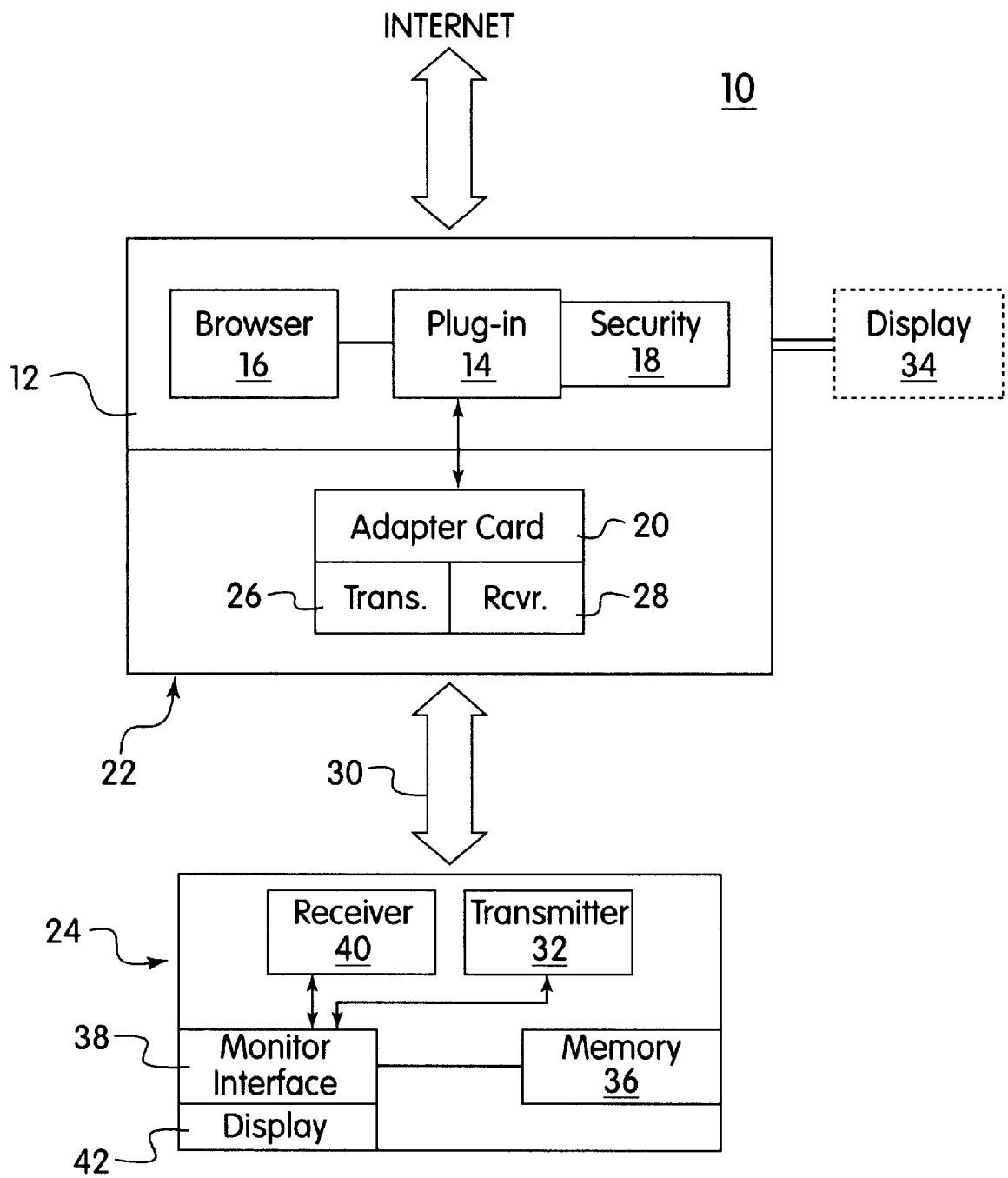
FIG. 1 is a block diagram showing a monitoring system for Internet browsers in accordance with one embodiment of the present invention.

Referring now to the drawings in which like numerals represent the same or similar elements and initially to FIG. 1, a schematic diagram shows a monitoring system 10 for monitoring Internet browsers. Monitoring system 10 will be referred to generally hereinafter as system 10. System 10 includes an embedded software component 12. Embedded software component 12 includes a software plug-in 14 and an Internet browser 16. Software plug-in 14 preferably includes program code written in a common language, preferably Java, which is compatible with browser 16. Plug-in 14 integrates with browser 16 once installed (installation may be performed by a simple one "click command" for example). Plug-in 14 serves to communicate with an adapter card 20 to provide control settings and an application program interface (API) to other software/hardware systems. Browser 16 is a software implementation which may include any Internet browser used for visiting and navigating websites on the world wide web, etc. Plug-in 14 is preferably compatible with browser 16, i.e., both may include program instructions written in a same programming language.

In a preferred embodiment, plug-in 14 interfaces with a security device 18 which includes encrypted data for providing security for system 10. More details of the security feature will be described below.

Adaptor card 20 is included in system 10. Adapter card 20 includes in an Internet access unit 22 which includes and executes plug-in 14 and browser 16. In this way, information may be collected from browser through plug-in 14 to obtain which websites or which programs are being executed and utilized on Internet access unit 22. Internet access unit 22 preferably includes a personal computer having standard equipment. Other hardware and software may be included. The personal computer preferably includes a display, input devices such as a keyboard or pad, a mouse etc. and a processing unit. The personal computer may be connected to the Internet via an internal or external modem or by using other connection types known in the art. Also, other Internet access systems may be employed as well, for example a personal digital assistant. Further, Internet access unit 22 may include a televison set and hardware/software associated therewith which supports Internet access.

Adapter card 20 and plug-in 14 function as a transmission device to provide information from browser 16 and Internet access unit 22 to monitor/control unit 24. Adapter card 20 supports two-way communication with a remotely disposed monitor/control unit 24. Adapter card 20 includes a transmitter 26 and a receiver 28 for respectively sending and receiving information collected by plug-in 14. Plug-in 14 records the URLs being accessed by browser 16 and transmits the information to adapter card 20. Alternately, for monitoring PC usage and/or websites being accessed a snapshot of the screen of the display of the Internet access unit or personal computer may be recorded by plug-in 14 transmitting the information to adapter card 20. Adapter card 20 transmits the information collected, i.e., URLs and/or screen snapshots via transmitter 26 to monitor/control unit 24. Monitor/control unit 24 includes a receiver 40 for receiving the transmitted information signals. Adapter card 20 is coupled to monitor/control unit 24 for transmitting and receiving information signals by a connection 30. Connection 30 may include a hard wired cable, such as coaxial cable, or a wireless connection such as a radio frequency (RF) connection. Other connection types may also be employed.

Monitor/control unit 24 includes a transmitter 32 and a receiver 40. Receiver 40 receives information transmitted from adapter card 20 and displays the URL information and/or snapshots of the browser screen from a display 34 of Internet access unit 22. It is to be understood that recording of Internet user activities may include recording the contents of the URLs as well as the URLs themselves. Display 34 may include a television screen, a monitor for a personal computer, a personal digital assistant display, etc. The transmitted information may be displayed in real time or recorded in a memory 36 for later viewing. Plug-in 14 may provide a warning to users of browser 16 that the user is being monitored.

Monitor/control unit 24 includes transmitter 32 for sending control signals to adapter card 20. Control signals may be provided using a monitoring interface 38 which preferably includes the personal computer, a televison or personal digital assistant having a display 42 used to display transmitted information from adapter card 20 including URL, contents thereof and/or screen snapshots from display 34. Control signals may be provided as warning information such as, "please terminate this session" or "please get back to work". Further, control signals may be provided to turn off the computer employing the browser, or terminating the modem connection, etc.

In a preferred embodiment, adaptor card 20 includes receiver 28, upon receiving a command from monitor/control unit 24, adaptor card 20 collects information from a video memory buffer of Internet access unit 22 together with the information collected from the Internet browser 16 and transmit to monitor/control unit 24 the information collected. System 10 may be turned on or off from monitor/control unit to prevent users from further viewing display 34 and from further use of the Internet. System 10 may be turned on or off by using a password security system or security device 18 to prevent tempering. Monitor/control unit 24 may continuously or intermittently monitor display 34 and browser 16.

Although described in terms of Internet usage, system 10 may be used to simply check up on children or employees to determine what is on the screen, for example, to determine if schoolwork or work is being performed and that inappropriate activities such as playing video games, etc. are not being performed.

Figure 2:
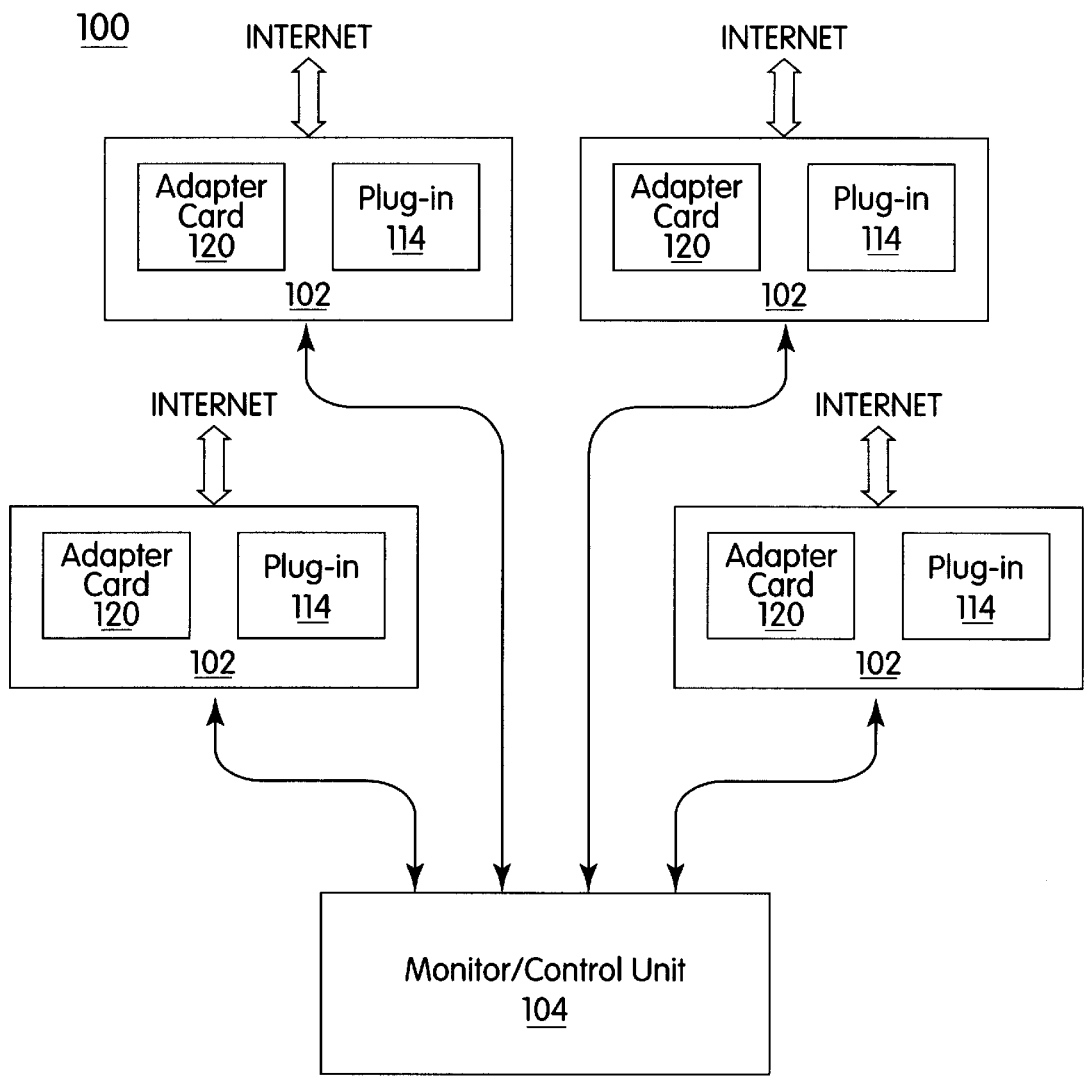
FIG. 2 is a block diagram showing a monitoring system for Internet browsers and computers showing a plurality of Internet access unit or computer terminals in accordance with another embodiment of the present invention.

Referring to FIG. 2, another embodiment of the present invention is shown. A system 100 includes a plurality of Internet access units or computers 102 (i.e., computers of FIG. 3). Units 102 each include plug-ins 114 which are similar to plug-in 14 and adapter card 120 which are similar to adapter card 20. Adapter cards 120 provide identifying signals to a remote monitor/control unit 104 (which includes all the features of monitor/control unit 24) such that each terminal or Internet access unit 102 may be uniquely identified. Unique identification may be provided by providing transmitted signals from adapter cards 120 with different characteristics or digital codes may be use as well as password or user identification information. Remote monitor/control unit 104 may accordingly record and view URL/screen snapshot information to take appropriate actions, such as turn off individual Internet access units 102. In accordance with the present invention, snapshot/URL sampling frequency may be controlled by monitor/control units 24 (FIG. 1) and 104 (FIG. 2).

Figure 3:
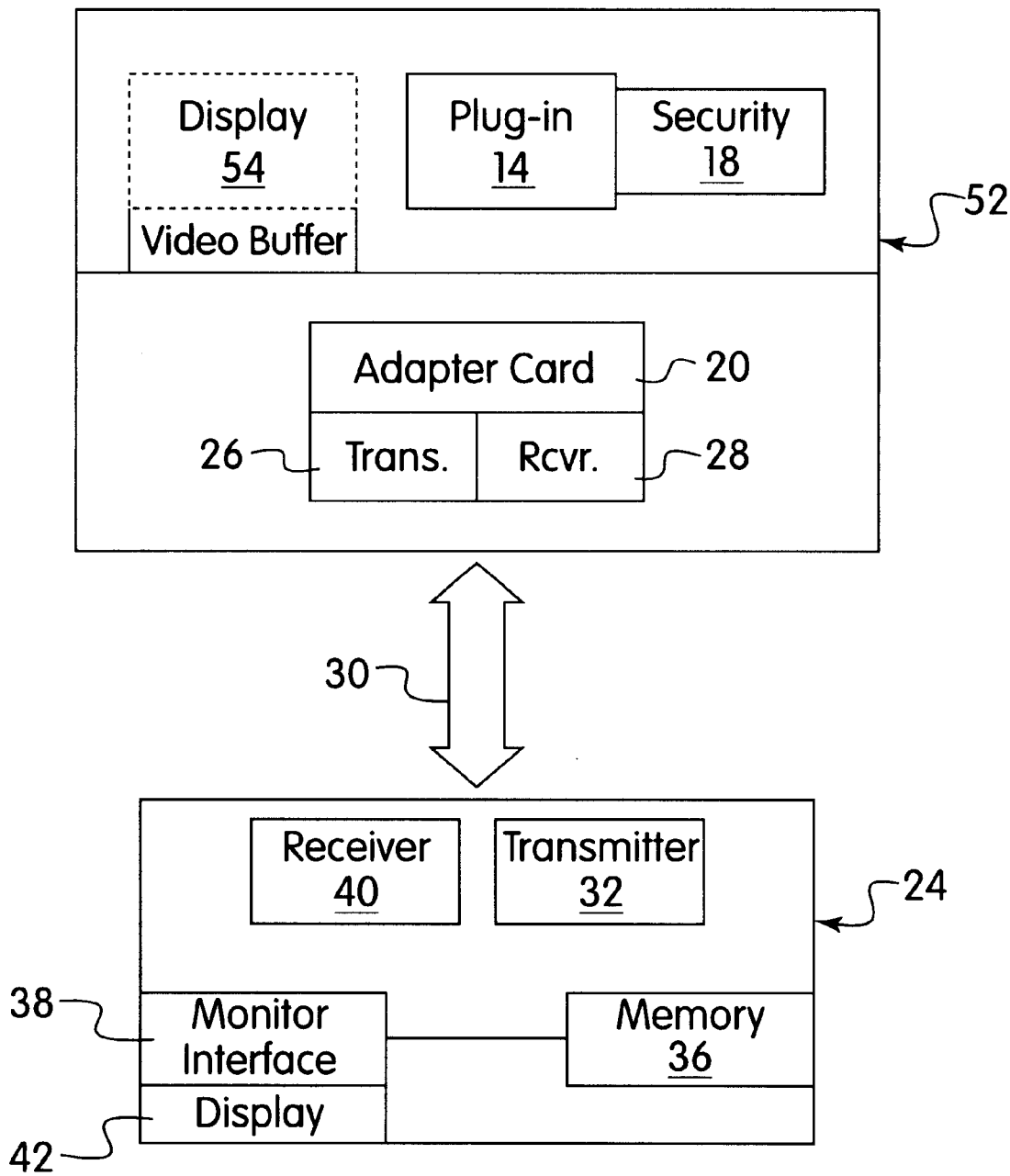
FIG. 3 is a block diagram showing a monitoring system for computer terminals in accordance with another embodiment of the present invention.

Referring to FIG. 3, a computer display monitoring system 50 is shown. Computer display monitoring system 50 includes adapter card 20 and plug-in 14 for accessing a video buffer representing a display 54 of a computer terminal or computer terminals 52. Monitor/control unit 24 is included for recording and monitoring computer usage according to the displayed images. Adapter card 20 and plug-in 14 comprise a display access unit for accessing video data of computer display 54, from a video buffer for example. Video information/data displayed on display 54 is retrieved and transmitted to monitoring/control unit 24. Monitoring/control unit is remotely disposed from the display access unit and coupled thereto by connection 30. Monitoring/control unit 24 includes a display for viewing and recording the computer activity information from display or displays 54.

Having described preferred embodiments of monitoring system for computers and Internet browsers (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A system for monitoring Internet usage comprising:
   an Internet access unit for accessing the Internet, the internet access unit including a browser for navigating on the Internet;
   a transmission device associated with a particular Internet access unit for transmitting browser activity and providing browser activity information to be transmitted to a monitoring unit; and
   the monitoring unit remotely disposed from the Internet access unit and coupled to the transmission device, the monitoring unit including a display, the monitoring unit for viewing and recording Internet activity of the Internet access unit, the monitoring unit including a control unit for sending messages to and turning on/off the Internet access unit.

2. The system as recited in claim 1, wherein the transmission device includes a software plug-in.

3. The system as recited in claim 1, wherein the transmission device includes an adapter card.

4. The system as recited in claim 1, wherein the Internet access unit includes a personal computer.

5. The system as recited in claim 1, wherein the Internet access unit includes a televison.

6. The system as recited in claim 1, wherein the monitoring unit includes a receiver for receiving the transmitted browser activity information.

7. The system as recited in claim 1, wherein the monitoring unit is coupled to the transmission device by a wireless connection.

8. The system as recited in claim 1, wherein the monitoring unit is coupled to the transmission device by a cable.

9. The system as recited in claim 1, wherein the monitoring unit includes one of a personal computer, a televison and a personal digital assistant.

10. The system as recited in claim 1, wherein the transmission device includes a security device to provide password access to the system.

11. The system as recited in claim 1, wherein the browser activity information includes one of URLs, contents of URLs and screen snapshots for the Internet access unit.

12. The system as recited in claim 1, wherein the monitor unit monitors a plurality of Internet access units concurrently.

13. A system for monitoring computer usage comprising:
    a display access unit for accessing video data of a computer display, the display access unit including:
        an adapter card for retrieving video information displayed on the computer display, the adapter card including means for transmitting computer display information to provide computer activity information to be transmitted to a monitoring unit; and
    the monitoring unit remotely disposed from the display access unit and coupled to the means for transmitting, the monitoring unit including a display, the monitoring unit for viewing and recording the computer activity information from the computer display, the monitoring unit including a control unit for sending messages to and turning on/off the display.

14. The system as recited in claim 13, wherein the display access unit includes a software plug-in.

15. The system as recited in claim 13, wherein the monitoring unit includes a receiver for receiving the transmitted computer activity information.

16. The system as recited in claim 13, wherein the monitoring unit is coupled to the means for transmitting by a wireless connection.

17. The system as recited in claim 13, wherein the monitoring unit is coupled to the means for transmitting by a cable.

18. The system as recited in claim 13, wherein the monitoring unit includes one of a personal computer, a television and a personal digital assistant.

19. The system as recited in claim 13, wherein the display access unit includes a security device to provide password access to the system.

20. The system as recited in claim 13, wherein the computer activity information includes screen snapshots.

21. The system as recited in claim 13, wherein the monitor unit monitors a plurality of display access units concurrently.

22. A system for monitoring Internet usage comprising:
    at least one computer terminal for accessing the Internet, the at least one computer terminal including a display for viewing Internet activity by a user, the at least one computer terminal including a browser for navigating on the Internet;
    means for transmitting browser activity from the computer terminal to provide browser activity information be transmitted to a monitoring unit, the means for transmitting including a plug-in software package for collecting the browser activity information and an adapter card for transmitting the browser activity information to the monitoring unit; and the monitoring unit remotely disposed from the at least one computer terminal and coupled to the means for transmitting, the monitoring unit including a display for viewing one of URLs, contents of URLs and snapshots of video images displayed on the display of the at least one computer terminal which were transmitted to the monitor unit for monitoring Internet browser activity on the computer terminal, the monitoring unit including a control unit for sending messages to and turning on/off the at least one computer terminal.

23. The system as recited in claim 22, wherein the monitoring unit is coupled to the means for transmitting by a wireless connection.

24. The system as recited in claim 22, wherein the monitoring unit is coupled to the means for transmitting by a cable.

25. The system as recited in claim 22, wherein the monitoring unit includes one of a personal computer, a television and a personal digital assistant.

26. The system as recited in claim 22 wherein the software plug-in includes a security device to provide password access to the system.

* * * * *